(12) United States Patent
Chang

(10) Patent No.: US 11,447,883 B2
(45) Date of Patent: Sep. 20, 2022

(54) WET SUBSTRATE PROCESSING DEVICE

(71) Applicant: EBARA CORPORATION, Tokyo (JP)

(72) Inventor: Shao Hua Chang, Tokyo (JP)

(73) Assignee: EBARA CORPORATION, Tokyo (JP)

( * ) Notice: Subject to any disclaimer, the term of this patent is extended or adjusted under 35 U.S.C. 154(b) by 27 days.

(21) Appl. No.: 16/858,701

(22) Filed: Apr. 26, 2020

(65) Prior Publication Data

US 2020/0378021 A1 Dec. 3, 2020

(30) Foreign Application Priority Data

May 27, 2019 (JP) .............................. JP2019-098753

(51) Int. Cl.
*C25D 3/02* (2006.01)
*C25D 5/08* (2006.01)

(52) U.S. Cl.
CPC ..................... *C25D 3/02* (2013.01); *C25D 5/08* (2013.01)

(58) Field of Classification Search
None
See application file for complete search history.

(56) References Cited

U.S. PATENT DOCUMENTS

| | | | | |
|---|---|---|---|---|
| 4,244,233 A | * | 1/1981 | Brems | F16H 21/30 74/29 |
| 4,697,933 A | * | 10/1987 | Morita | F16C 29/025 384/100 |
| 2006/0264294 A1 | * | 11/2006 | Summa | F16H 21/365 475/210 |
| 2011/0315416 A1 | * | 12/2011 | Watanabe | B23D 49/00 173/58 |
| 2015/0368825 A1 | * | 12/2015 | Mine | C25D 21/10 204/273 |
| 2018/0087566 A1 | * | 3/2018 | Chien | F16C 32/0618 |

FOREIGN PATENT DOCUMENTS

JP 2016006225 1/2016

* cited by examiner

*Primary Examiner* — Louis J Rufo
(74) *Attorney, Agent, or Firm* — JCIPRNET

(57) ABSTRACT

Provided is a stirring paddle driving mechanism with a small load. According to one embodiment, a wet substrate processing device is provided, having: a treatment tank for holding a treatment solution; a stirring paddle disposed inside the treatment tank; and a driving mechanism for driving the stirring paddle, wherein the driving mechanism has: a rotary motor; a central rotating member connected to the rotary motor; an outer fixed ring spaced from the central rotating member and surrounding an outside of the central rotating member; a planetary member connected to the central rotating member so as to rotate inside the outer fixed ring; and a driving shaft connected to the planetary member and the stirring paddle and extending in a radial direction of the outer fixed ring, wherein the driving shaft is configured to reciprocate in a longitudinal direction by rotation of the rotary motor.

10 Claims, 12 Drawing Sheets

WET SUBSTRATE PROCESSING DEVICE

CROSS-REFERENCE TO RELATED APPLICATION

This application claims the priority benefit of Japan Application No. 2019-098753, filed on May 27, 2019. The entirety of the above-mentioned patent application is hereby incorporated by reference herein and made a part of this specification.

BACKGROUND

Technical Field

The disclosure relates to a wet processing device, particularly to a plating device.

Related Art

Electroplating is sometimes used in the manufacture of semiconductor devices. According to an electroplating method, a high-purity metal film (plating film) can be easily obtained, the metal film can be formed at a relatively high speed and the thickness of the metal film can be controlled relatively easily. In forming a metal film on a semiconductor wafer, in-plane uniformity of the film thickness is also required in order to achieve high-density mounting, high performance, and high yield. According to electroplating, it is expected that a metal film having excellent in-plane uniformity of film thickness can be obtained by achieving a uniform metal ion supply rate distribution or potential distribution in a plating solution. In electroplating, the plating solution is sometimes stirred in order to supply a sufficient amount of ions uniformly to a substrate. In order to stir the plating solution, there is known a plating device including a paddle for stirring (Patent Document 1).

PATENT DOCUMENTS

Patent Document 1: Japanese Laid-open No. 2016-6225

In electroplating, in order to supply a sufficient amount of ions uniformly to the substrate, a stirring speed of the paddle for stirring tends to increase. The paddle for stirring is driven by, for example, a driving mechanism, so as to linearly reciprocate within the plating solution. As an example, the driving mechanism of the paddle for stirring includes a crank mechanism, and a rotational motion of a motor is converted into a linear reciprocating motion by the crank mechanism. When the stirring speed increases, a large load is applied to a driving force transmission mechanism such as the crank mechanism, and the life of the driving mechanism is shortened. In addition, in order to reduce the load on the driving mechanism, it is important to regularly grease up the driving mechanism. However, it takes much time to grease up the driving mechanism. Therefore, the disclosure provides a stirring paddle driving mechanism with a small load.

SUMMARY

According to one embodiment, a wet substrate processing device is provided, having: a treatment tank for holding a treatment solution; a stirring paddle disposed inside the treatment tank; and a driving mechanism for driving the stirring paddle, wherein the driving mechanism has: a rotary motor; a central rotating member connected to the rotary motor; an outer fixed ring spaced from the central rotating member and surrounding an outside of the central rotating member; a planetary member connected to the central rotating member so as to rotate inside the outer fixed ring; and a driving shaft connected to the planetary member and the stirring paddle and extending in a radial direction of the outer fixed ring, wherein the driving shaft is configured to reciprocate in a longitudinal direction by rotation of the rotary motor.

DESCRIPTION OF THE EMBODIMENTS

Figure 1:
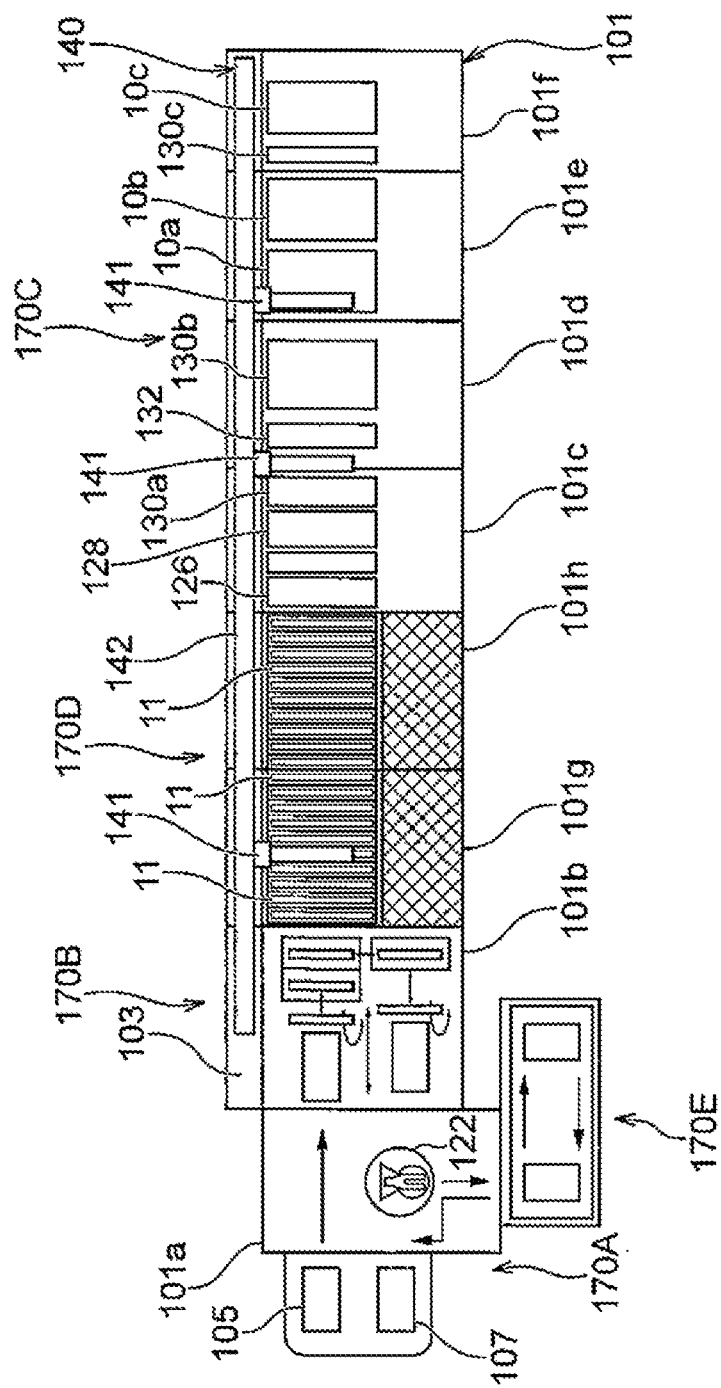
FIG. 1 is a schematic view illustrating a plating device according to one embodiment.

Hereinafter, an embodiment of a plating device as an example of a wet substrate processing device according to the disclosure will be described with reference to the accompanying drawings. In the accompanying drawings, the same or similar elements are denoted by the same or similar reference numerals, and in the description of each embodiment, the repeated description of the same or similar elements may be omitted. The features shown in each embodiment can be applied to other embodiments as long as they do not contradict each other.

FIG. 1 is a schematic view illustrating one embodiment of a plating device. As shown in FIG. 1, the plating device includes: a frame 101; a controller 103 controlling operation of the plating device; a loading/unloading part 170A loading and unloading a substrate W to be plated; a substrate setting part (mechanical chamber) 170B in which the substrate W is set on and removed from a substrate holder 11; a processing part (pretreatment chamber, plating chamber) 170C plating the substrate W; a holder storage part (stocker chamber) 170D storing the substrate holder 11; and a cleaning part 170E cleaning and drying the plated substrate W. The plating device according to the present embodiment is an electroplating device plating a surface of the substrate W with a metal by flowing a current through a plating solution. In addition, the substrate W to be processed in the present embodiment is, for example, a semiconductor package substrate or the like.

As shown in FIG. 1, the frame 101 is composed of a plurality of frame members 101a to 101h, and the frame members 101a to 101h are configured to be connectable. Components of the loading/unloading part 170A are disposed on the first frame member 101a, components of the substrate setting part 170B are disposed on the second frame member 101b, components of the processing part 170C are disposed on the third frame member 101c to the sixth frame member 101f, and components of the holder storage part 170D are disposed on the seventh frame member 101g and the eighth frame member 101h.

Provided in the loading/unloading part 170A are a loading stage 105 on which a cassette (not shown) containing the substrate W before plating is mounted and an unloading stage 107 on which a cassette (not shown) receiving the substrate W plated in the processing part 170C is mounted. Further, a substrate transporting device 122 composed of a transport robot transporting the substrate W is disposed in the loading/unloading part 170A.

The substrate transporting device 122 is configured to access the cassette mounted on the loading stage 105, and remove the substrate W before plating from the cassette so as to pass the substrate W to the substrate setting part 170B. In the substrate setting part 170B, the substrate W before plating is set on the substrate holder 11, and the substrate W after plating is removed from the substrate holder 11.

In the processing part 170C, a prewetting bath 126, a presoaking bath 128, a first rinsing bath 130a, a blow bath 132, a second rinsing bath 130b, a first plating bath 10a, a second plating bath 10b, a third rinsing bath 130c and a third plating bath 10c are disposed. These baths 126, 128, 130a, 132, 130b, 10a, 10b, 130c and 10c are disposed in this order.

In the prewetting bath 126, the substrate W is immersed in degassed pure water in preparation for pretreatment. In the presoaking bath 128, an oxide film on a surface of a conductive layer such as a seed layer or the like formed on the surface of the substrate W is removed by etching with a chemical solution. In the first rinsing bath 130a, the substrate W after presoaking is cleaned with a cleaning solution (for example, pure water).

The substrate W is plated in at least one plating bath 10 from among the first plating bath 10a, the second plating bath 10b and the third plating bath 10c. Although the number of the plating baths 10 is three in the embodiment shown in FIG. 1, an arbitrary number of the plating baths 10 may be provided as another embodiment.

In the second rinsing bath 130b, the substrate W plated in the first plating bath 10a or the second plating bath 10b is cleaned together with the substrate holder 11 with a cleaning solution (for example, pure water). In the third rinsing bath 130c, the substrate W plated in the third plating bath 10c is cleaned together with the substrate holder 11 with a cleaning solution (for example, pure water). In the blow bath 132, the substrate W after cleaning is subjected to draining.

The prewetting bath 126, the presoaking bath 128, the rinsing baths 130a to 130c, and the plating baths 10a to 10c are treatment tanks capable of storing a treatment solution (liquid) therein. These treatment tanks include a plurality of treatment cells storing the treatment solution. However, the disclosure is not limited to this embodiment, and these treatment tanks may include a single treatment cell. In addition, at least some of these treatment tanks may include a single treatment cell, and the other treatment tanks may include a plurality of treatment cells.

The plating device further includes a conveyor 140 transporting the substrate holder 11. The conveyor 140 is configured to be movable between the components of the plating device. The conveyor 140 includes a fixed base 142 extending in a horizontal direction from the substrate setting part 170B to the processing part 170C and a plurality of transporters 141 configured to be movable along the fixed base 142.

These transporters 141 each have a movable part (not shown) for holding the substrate holder 11, and are configured to hold the substrate holder 11. The transporter 141 transports the substrate holder 11 between the substrate setting part 170B, the holder storage part 170D, and the processing part 170C, and is further configured to move the substrate holder 11 up and down together with the substrate W. Examples of a moving mechanism of the transporter 141 include a combination of a motor and a rack and pinion. Although three transporters are provided in the embodiment shown in FIG. 1, an arbitrary number of transporters may be employed as another embodiment.

Figure 2:
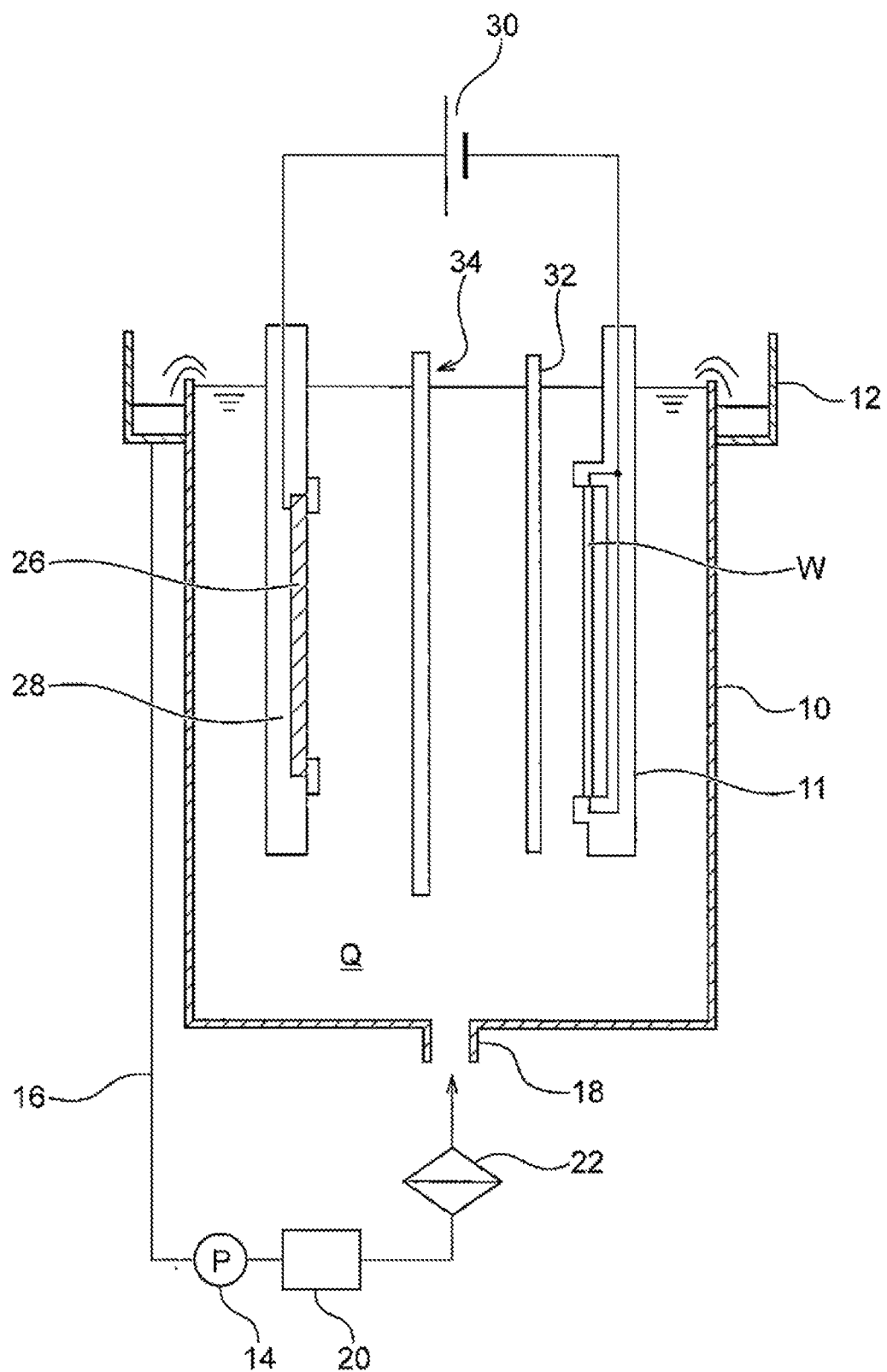
FIG. 2 is a cross-sectional side view illustrating a plating device according to one embodiment.

FIG. 2 is a cross-sectional side view illustrating a plating device according to one embodiment. As shown in FIG. 2, the plating device has a plating bath 10 holding a plating solution Q therein, and an overflow bath 12 receiving the plating solution Q overflowing from an edge of the plating bath 10 is provided on an upper outer periphery of the plating bath 10. One end of a plating solution supply passage 16 including a pump 14 is connected to a bottom of the overflow bath 12, and the other end of the plating solution supply passage 16 is connected to a plating solution supply port 18 provided at a bottom of the plating bath 10. Accordingly, the plating solution Q accumulated in the overflow bath 12 is refluxed into the plating bath 10 with the driving of the pump 14. In the plating solution supply passage 16, a constant temperature unit 20 located downstream of the pump 14 and adjusting the temperature of the plating solution Q and a filter 22 filtering and removing foreign matter in the plating solution Q are interposed.

The plating device includes the substrate holder 11 detachably holding the substrate (plated object) W and immersing the substrate W in a vertical state in the plating solution Q in the plating bath 10. In a position in the plating bath 10 that faces the substrate holder 11, an anode holder 28 holding an anode 26 is disposed. In this example, phosphorous-containing copper is used as the anode 26. The substrate W and the anode 26 are electrically connected via a plating power source 30. By flowing a current between the substrate W and the anode 26, a plating film (copper film) is formed on the surface of the substrate W.

Between the substrate W held by the substrate holder 11 disposed in the plating solution Q and the anode 26, a paddle 32 reciprocating in parallel with the surface of the substrate W and stirring the plating solution Q is disposed. In this way, by stirring the plating solution Q with the paddle 32, sufficient copper ions can be uniformly supplied to the surface of the substrate W. A distance between the paddle 32 and the substrate W is preferably 5 mm to 11 mm. Further, between the paddle 32 and the anode 26, a regulation plate 34 made of a dielectric for making potential distribution more uniform over the entire surface of the substrate W is disposed.

Figure 3:
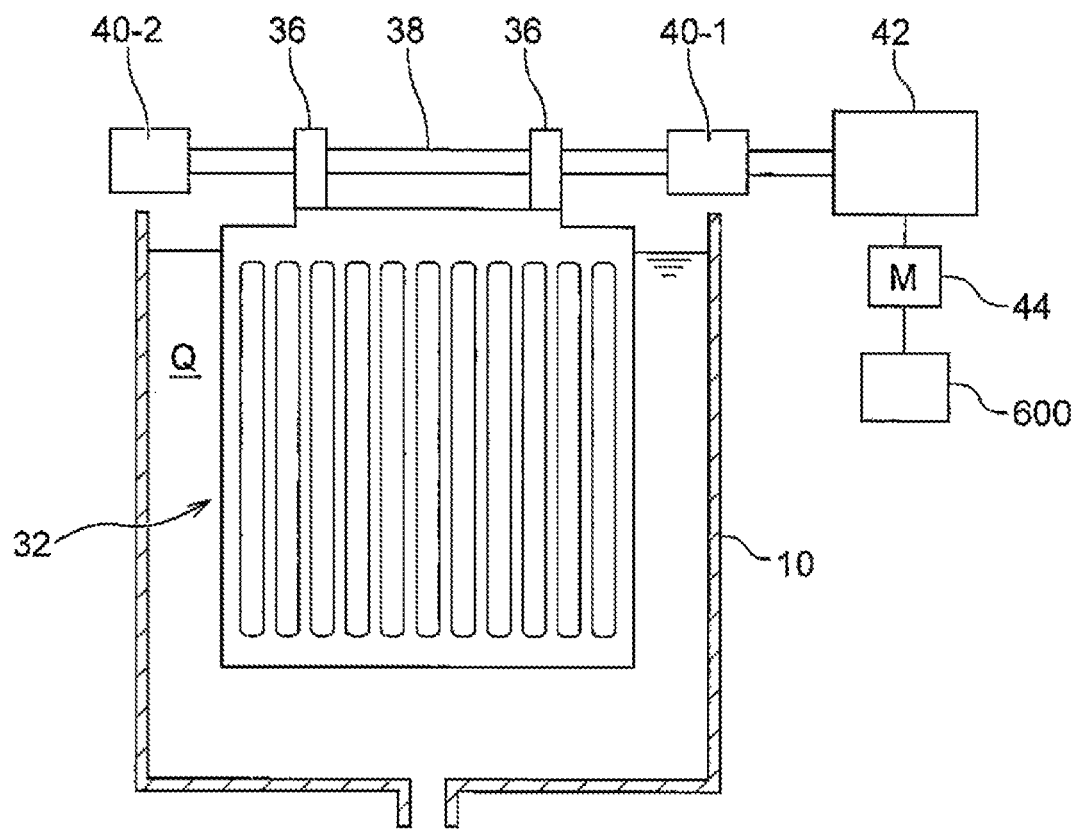
FIG. 3 illustrates a driving mechanism of a paddle along with a plating bath according to one embodiment.

FIG. 3 illustrates a driving mechanism of the paddle 32 along with the plating bath 10 according to one embodiment. FIG. 3 corresponds to a view of the paddle 32 shown in FIG. 2 as viewed from the left side. The paddle 32 is fixed to a horizontally extending shaft 38 by a clamp 36 fixed to an upper end of the paddle 32. The shaft 38 can slide left and right while being held by shaft guides 40-1 and 40-2. An end of the shaft 38 is connected to a driving mechanism 42 that causes the paddle 32 to linearly reciprocate left and right. The driving mechanism 42 converts rotation of a motor 44 into the linear reciprocating motion of the shaft 38 as described later. In one embodiment, rotational speed of the motor 44 may be configured to be controlled by a control device 600.

Figure 4:
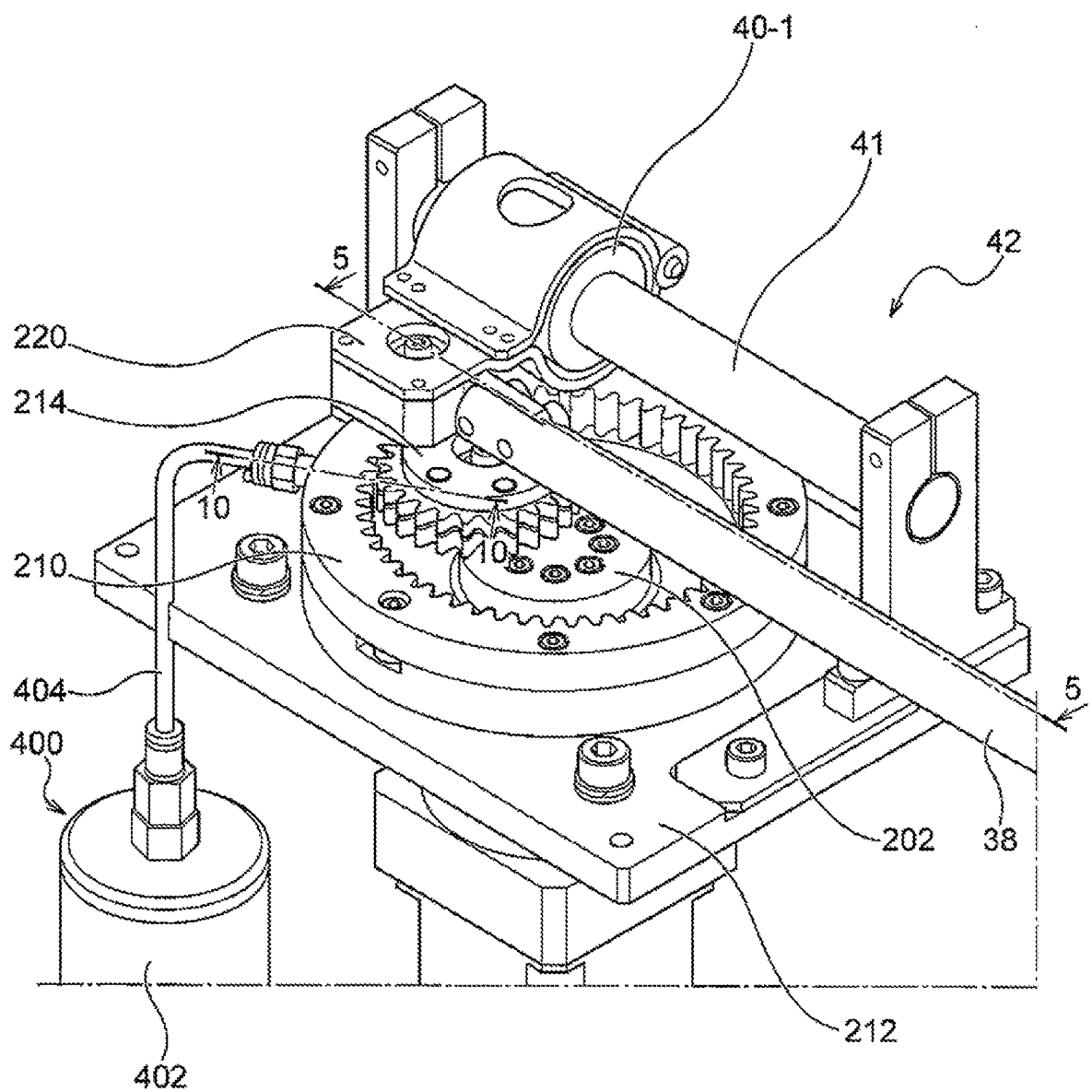
FIG. 4 is a perspective view illustrating a driving mechanism of a paddle according to one embodiment.
Figure 5:
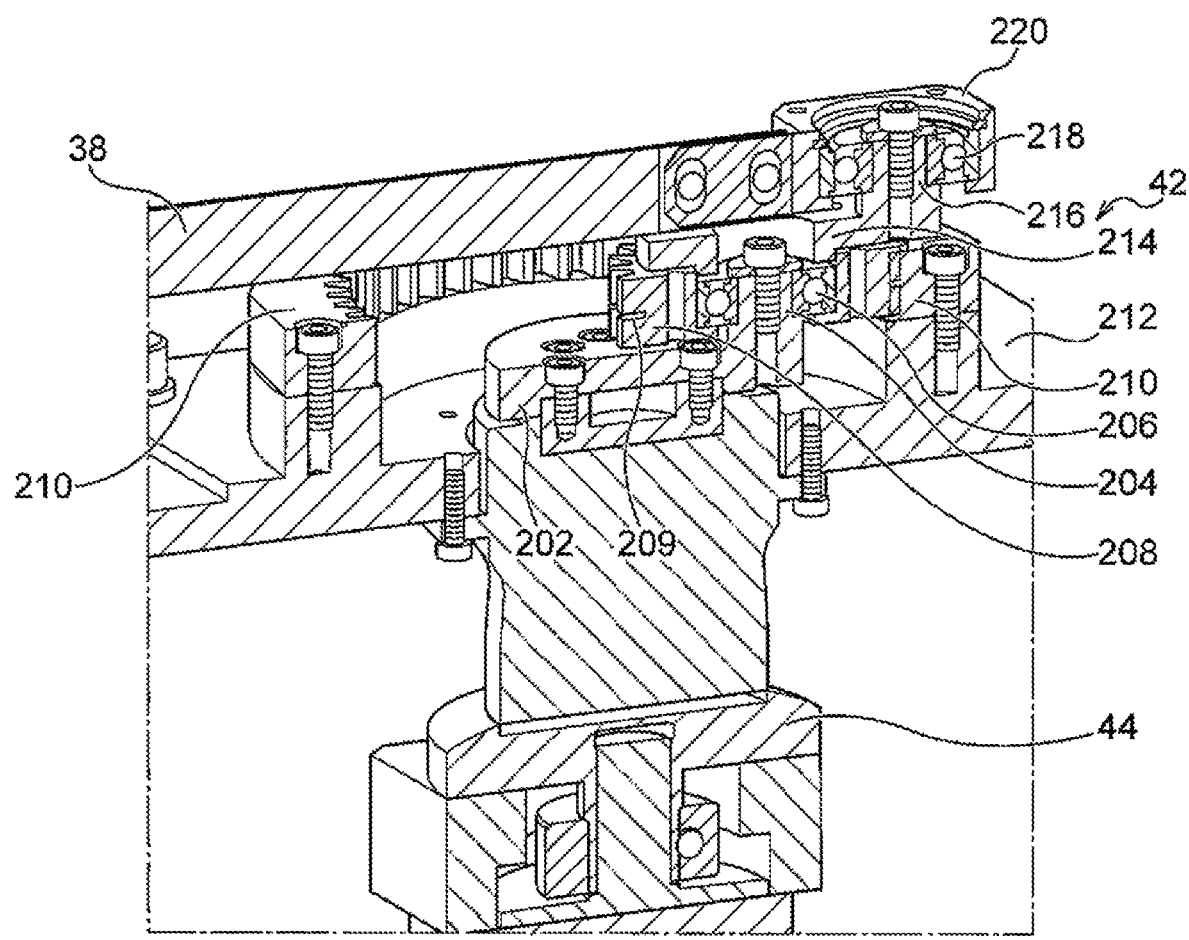
FIG. 5 is a cross-sectional view as viewed from an arrow in FIG. 4.
Figure 6A:
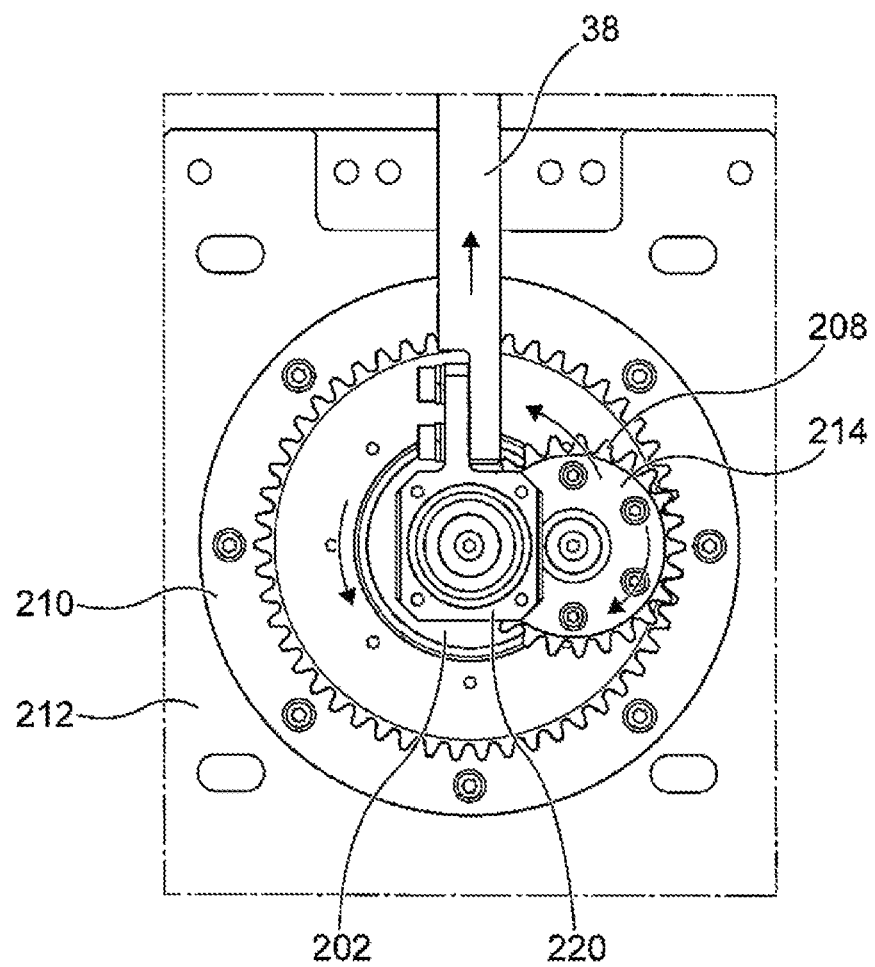
FIG. 6A is a top view of the driving mechanism shown in FIG. 4 as viewed from above.
Figure 6B:
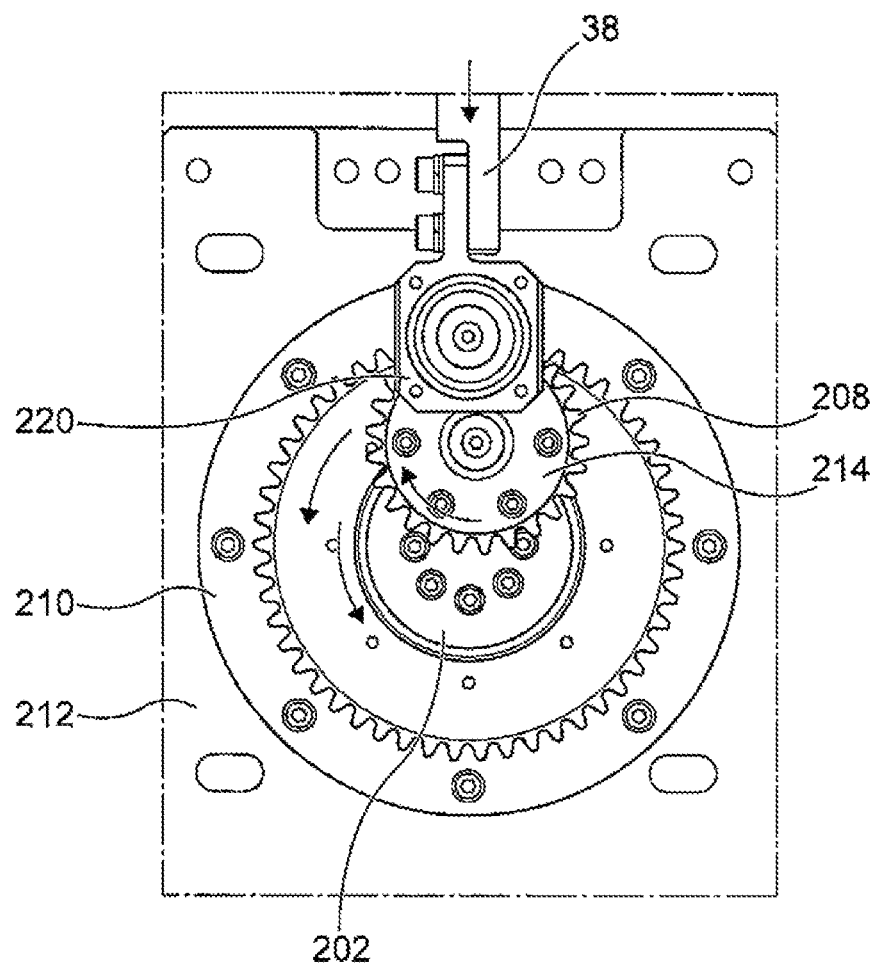
FIG. 6B is a top view of the driving mechanism shown in FIG. 4 as viewed from above.
Figure 6C:
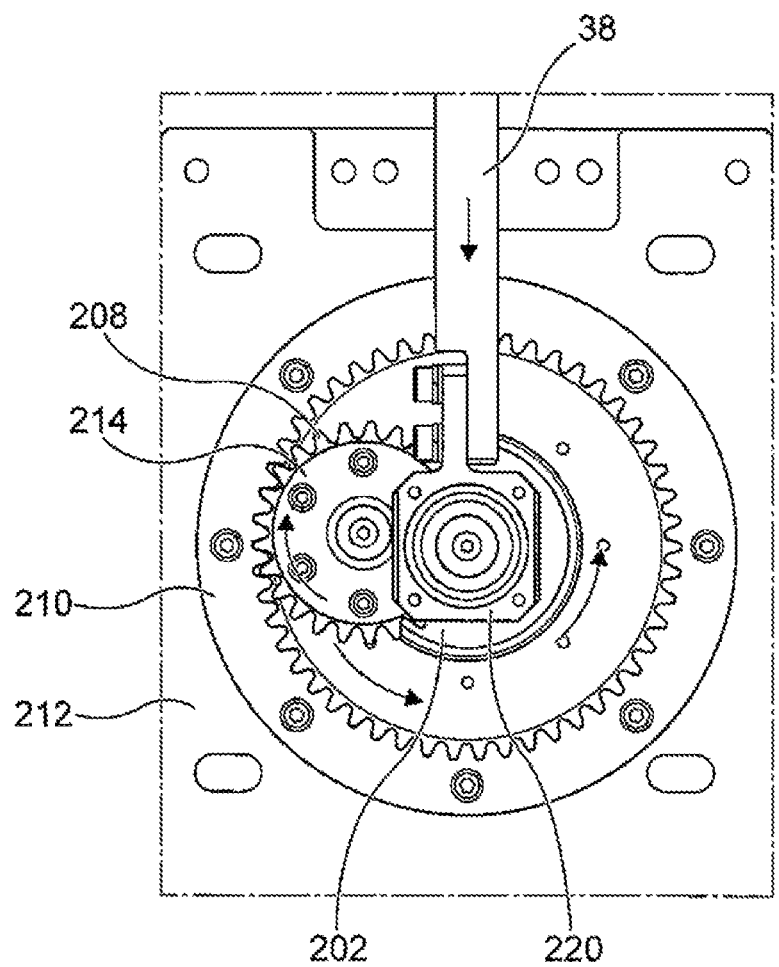
FIG. 6C is a top view of the driving mechanism shown in FIG. 4 as viewed from above.
Figure 6D:
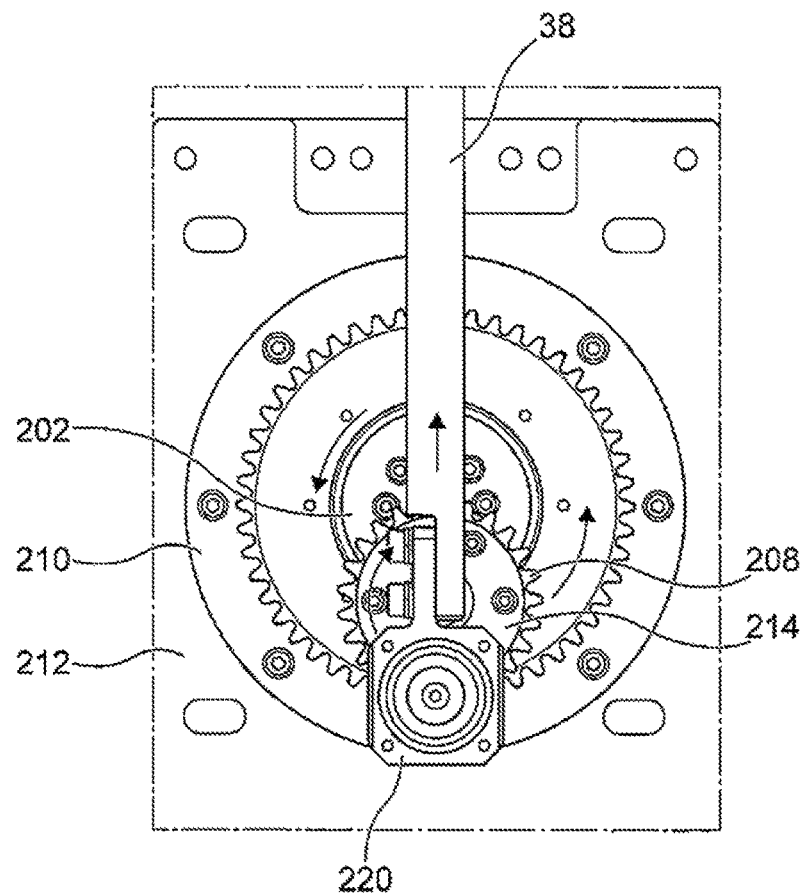
FIG. 6D is a top view of the driving mechanism shown in FIG. 4 as viewed from above.

FIG. 4 is a perspective view illustrating the driving mechanism 42 of the paddle 32 according to one embodiment. FIG. 5 is a cross-sectional view as viewed from an arrow 5 in FIG. 4. FIG. 6A to 6D are top views of the driving mechanism 42 shown in FIG. 4 as viewed from above. As shown, the driving mechanism 42 includes the motor 44. As shown, a central rotating member 202 is connected to a rotor of the motor 44. Hence, the central rotating member 202 is rotationally driven by the motor 44. The central rotating member 202 is a disk-shaped member. The central rotating member 202 includes an upward protruding convex part 204 that is located radially outward from the center. A planetary member 208 is connected to the convex part 204 of the central rotating member 202 via a ball bearing 206. The central rotating member 202 and the planetary member 208 are relatively rotatably connected by the ball bearing 206. The planetary member 208 is a circular gear, and may also be referred to as a planetary gear. The driving mechanism 42 has an outer fixed ring 210 spaced from the central rotating member 202 and surrounding the outside of the central rotating member 202. As shown, the outer fixed ring 210 is an internal gear, and the planetary member 208 is configured to be rotatable inside the outer fixed ring 210. That is, by rotation of the motor 44 and the central rotating member 202, the planetary member 208 rotates around the center of the central rotating member 202 inside the outer fixed ring 210 while rotating on its own axis. The outer fixed ring 210 is fixed to a base member 212 and is configured not to rotate. As shown, a supporting member 214 rotating together with the planetary member 208 is fixed to an upper surface of the planetary member 208. The supporting member 214 includes an upward protruding convex part 216. The convex part 216 of the supporting member 214 is located radially outward from the center of the planetary member 208. As shown, a shaft base 220 is connected to the convex part 216 of the supporting member 214 via a ball bearing 218. By the ball bearing 218, the shaft base 220 is rotatably supported with respect to the supporting member 214 and the convex part 216. As shown, the shaft 38 is connected to the shaft base 220.

In one embodiment, as shown in FIG. 4, the shaft guide 40-1 is connected to the shaft base 220. In the embodiment shown in FIG. 4, the shaft guide 40-1 can be a non-contact bearing. In the embodiment shown in FIG. 4, an air bearing is used as the non-contact bearing, and is movable along a guide shaft 41 extending in a movement direction of the shaft 38. Hence, it is possible for the shaft 38 connected to the shaft base 220 to linearly reciprocate along the guide shaft 41. Since the air bearing is a non-contact bearing, it has no friction and has a long life.

FIG. 6A to 6D are top views illustrating movements of the shaft 38 by the driving mechanism 42 according to one embodiment. In the state shown in FIG. 6A, when the central rotating member 202 rotates counterclockwise by the motor 44, the planetary member 208 and the supporting member 214, while rotating clockwise (on their own axes), rotate (revolve) counterclockwise as a whole around the central rotating member 202 inside the outer fixed ring 210. At this time, by the rotation and revolution of the supporting member 214, the shaft base 220 moves in the upward direction in the drawing, thereby moving the shaft 38 upward. As a result, the paddle 32 connected to the shaft 38 linearly moves in the plating solution. By such an operation, the state shown in FIG. 6A shifts to the state shown in FIG. 6B. Similarly, by rotation of the motor 44, the various members rotate as described above, operate from the state shown in FIG. 6B to the state shown in FIG. 6C, reach the state shown in FIG. 6D, and then again achieve the state shown in FIG. 6A. By such an operation of the driving mechanism 42, the shaft 38 can be linearly reciprocated, and the paddle 32 connected to the shaft 38 can be linearly reciprocated in the plating bath 10 to stir the plating solution.

The shaft guide 40-1 by means of the air bearing as shown in FIG. 4 and FIG. 5 is shown to be disposed near the driving mechanism 42 shown in FIG. 3. However, a shaft guide similarly by means of an air bearing can also be disposed as the shaft guide 40-2 that is disposed far from the driving mechanism 42.

Since the driving mechanism 42 according to the above-described embodiment does not use a crank mechanism, even if a rotation speed of a motor increases, a transmission mechanism of the driving mechanism does not receive as much load as the crank mechanism. Hence, the life of the driving mechanism is prolonged.

Figure 7:
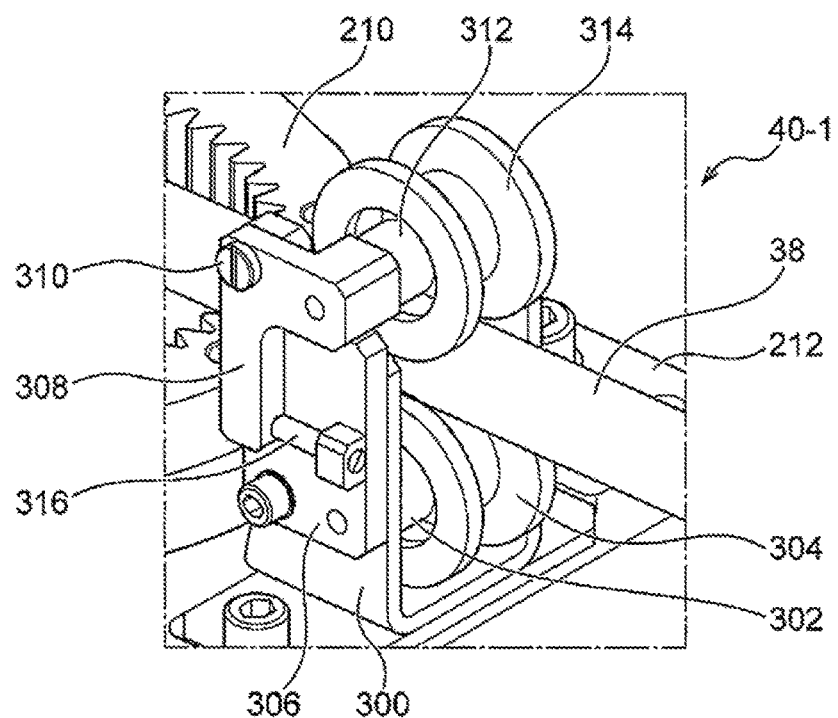
FIG. 7 is a perspective view illustrating an example of a shaft guide according to one embodiment.
Figure 8A:
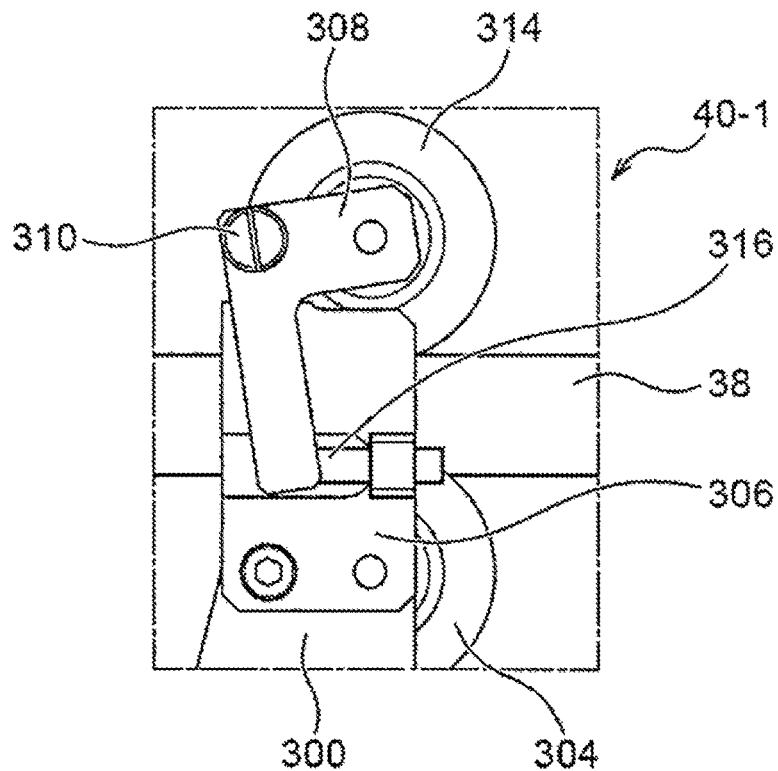
FIG. 8A is a side view of the shaft guide shown in FIG. 7.
Figure 8B:
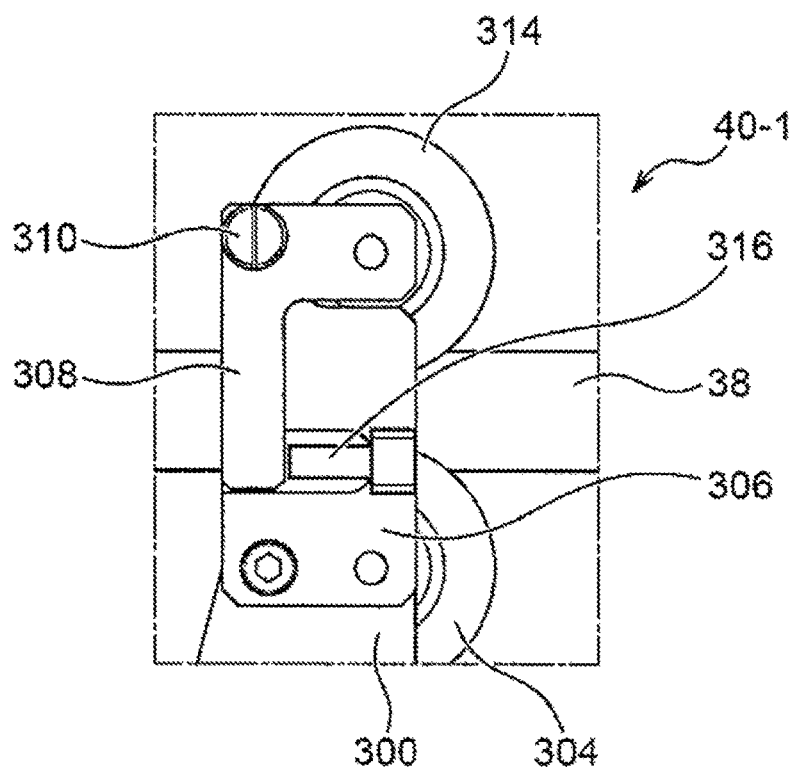
FIG. 8B is a side view of the shaft guide shown in FIG. 7.

Although in the above-described embodiment, the shaft guides 40-1 and 40-2 are composed of non-contact air bearings in order to reduce frictional resistance, in other embodiments, other methods, for example, contact type shaft guides may be used. FIG. 7 is a perspective view illustrating an example of the shaft guide 40-1 according to one embodiment. FIG. 8A and FIG. 8B are side views of the shaft guide 40-1 shown in FIG. 7.

As shown in FIG. 7, a substantially U-shaped fixed member 300 is fixed to an upper surface of the base member 212. A shaft 302 is disposed inside the fixed member 300, and a lower roller 304 is rotatably attached to the shaft 302. As shown in FIG. 7, the lower roller 304 is disposed inside the U-shaped fixed member 300. As shown, an adjusting member 306 is fixed to one outer side surface of the fixed member 300. Further, an L-shaped member 308 is connected to the adjusting member 306. As shown, the L-shaped member 308 is connected to the adjusting member 306 by a pin 310 at an intersection of two linear portions of the L shape. The L-shaped member 308 is connected to the adjusting member 306 so as to be rotatable around the pin 310. A shaft 312 is attached to one end of the L-shaped member 308, and an upper roller 314 is rotatably attached to the shaft 312. The upper roller 314 is configured to be disposed directly above the lower roller 304. As shown, an adjusting bolt 316 is attached to the adjusting member 306. As shown, an end of the adjusting bolt 316 faces the other end of the L-shaped member 308. The end of the adjusting bolt 316 is configured to be able to contact the other end of the L-shaped member 308. Hence, by turning the adjusting bolt 316 and pressing the other end of the L-shaped member 308 by the end of the adjusting bolt 316, the upper roller 314 attached to the one end of the L-shaped member 308 can be moved downward. FIG. 8B shows a state in which the adjusting bolt 316 is moved from the state of FIG. 8A, and the upper roller 314 is moved toward the lower roller 304. The shaft 38 to which the paddle 32 is connected is capable of linearly reciprocating while being supported between the upper roller 314 and the lower roller 304. The upper roller 314 and the lower roller 304 are formed of, for example, ultra-high molecular weight polyethylene (UHMWPE) or the like having excellent impact resistance and chemical resistance.

Figure 9:
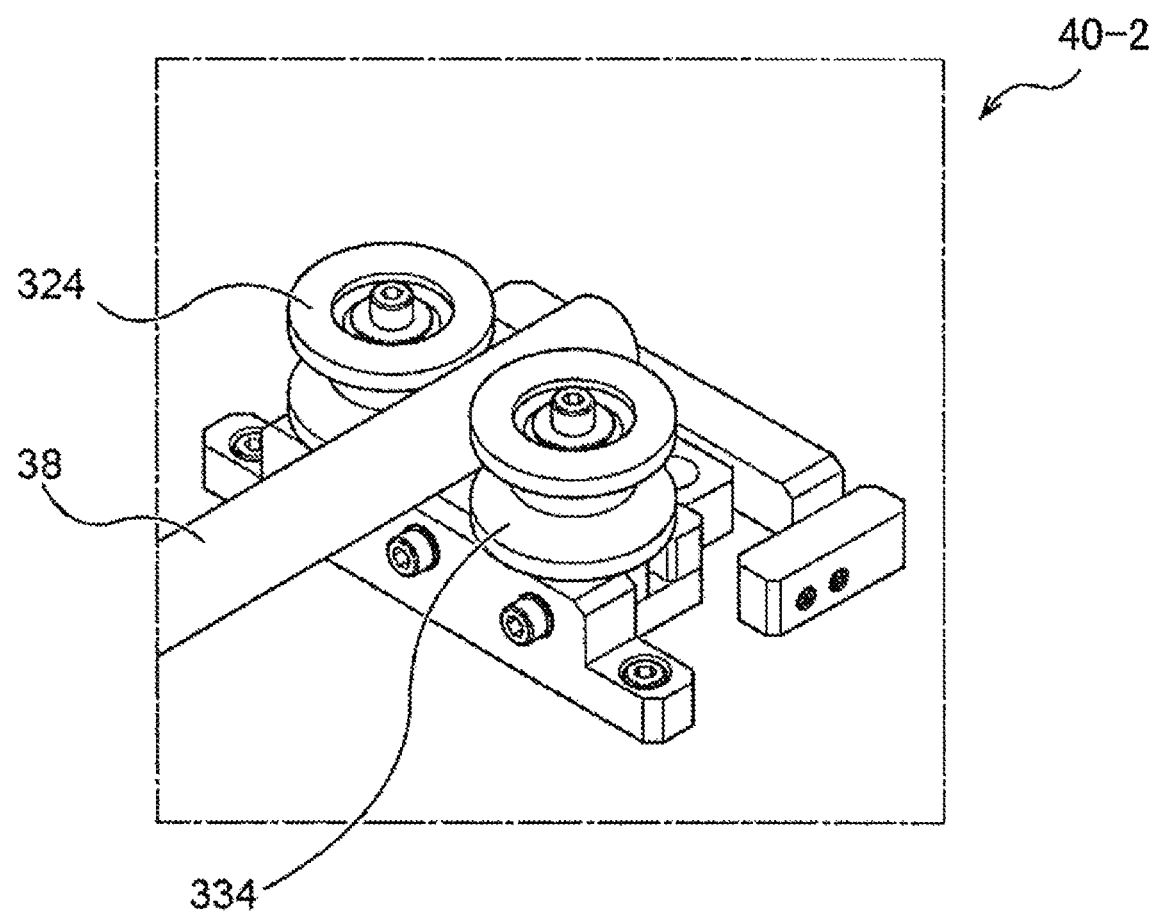
FIG. 9 is a perspective view illustrating an example of a shaft guide according to one embodiment.

FIG. 9 is a perspective view illustrating an example of the shaft guide 40-2 according to one embodiment. The shaft guide 40-2 shown in FIG. 9 is an example of the shaft guide 40-2 disposed far from the driving mechanism 42, as shown in FIG. 3. The shaft guide 40-2 shown in FIG. 9 supports the shaft 38 by a left roller 324 on the left side and a right roller 334 on the right side as viewed from the driving mechanism 42. The shaft guide 40-2 shown in FIG. 9 is configured so that the left roller and the right roller can be energized to relatively approach each other by a mechanism same as or similar to the embodiments shown in FIG. 7 and FIG. 8. For example, the shaft guide 40-2 may be configured to change the direction of the shaft guide 40-1 shown in FIG. 7 and FIG. 8 by 90 degrees. On this occasion, specific shapes of members relating to the shaft guide 40-2 that correspond to the fixed member 300, the adjusting member 306, the L-shaped member 308 and so on may be different from the shapes of the members of the shaft guide 40-1.

In the embodiments shown in FIG. 7 to FIG. 9, the shaft 38 is supported in the up-down direction by the shaft guide 40-1 located close to the driving mechanism 42, and the shaft 38 is supported in the left-right direction by the shaft guide 40-2 located far from the driving mechanism 42. As another embodiment, the shaft 38 may be supported in the left-right direction by the shaft guide 40-1 located close to the driving mechanism 42, and the shaft 38 may be supported in the up-down direction by the shaft guide 40-2 located far from the driving mechanism 42.

Although in the above-described embodiments, the driving mechanism 42 has been described as the driving mechanism of the paddle 32 for stirring the plating solution Q in the plating bath 10, the driving mechanism 42 according to the disclosure can be used as a driving mechanism of a paddle for stirring any liquid. For example, when the substrate W is immersed in the degassed pure water of the prewetting bath 126, the pure water may be stirred by the paddle 32 using the driving mechanism 42. Accordingly, removal of air bubbles from concave parts on the surface of the substrate W is facilitated.

In one embodiment, the plating device includes an automatic grease feeder for automatically supplying grease to the driving mechanism 42. FIG. 4 shows an automatic grease feeder 400. In the embodiment shown in FIG. 4, the automatic grease feeder 400 has a grease tank 402 storing grease. The grease in the grease tank 402 can be supplied from a grease line 404 by a pump (not shown). The grease tank 402 and the pump can be any known grease tank and pump.

Figure 10:
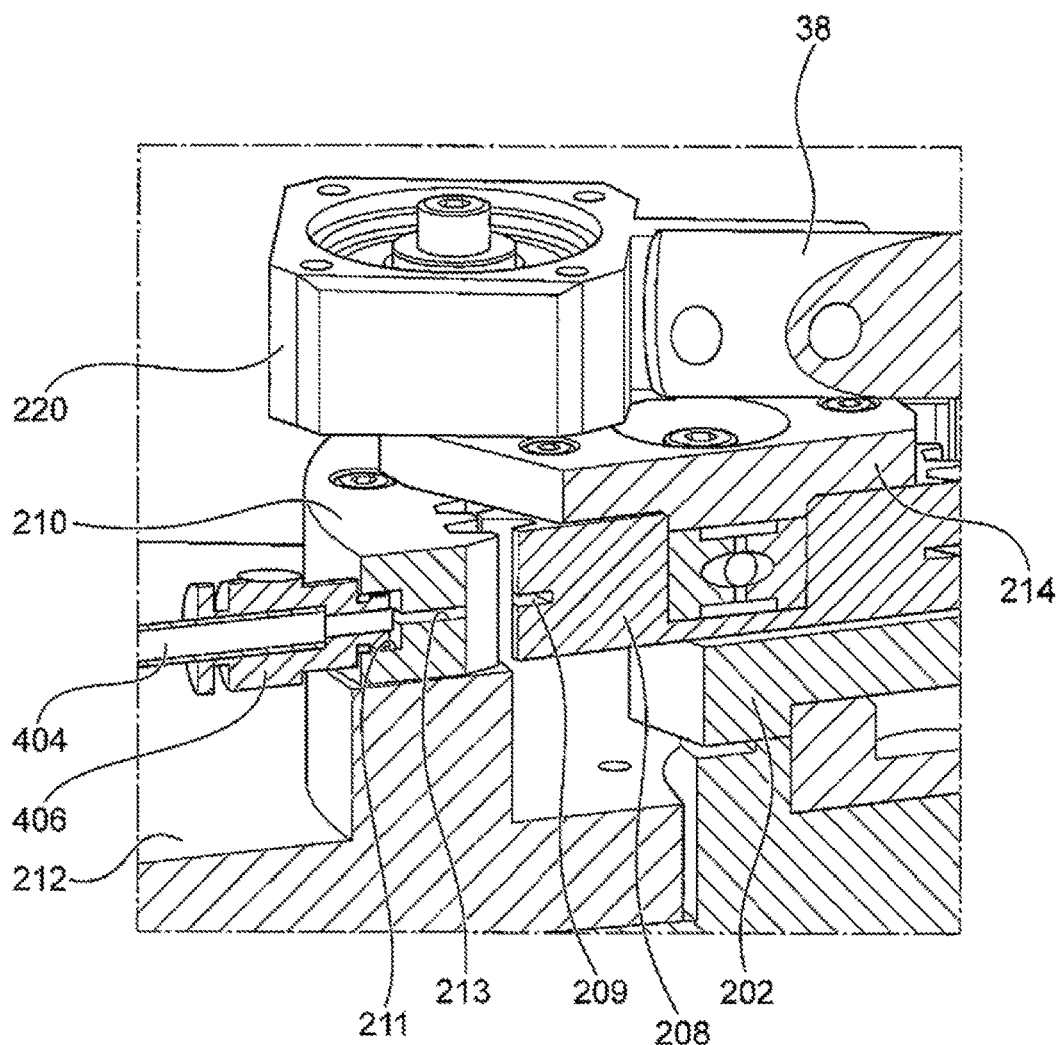
FIG. 10 is a partial cross-sectional view as viewed from an arrow 10 in FIG. 4.

FIG. 10 is a partial cross-sectional view as viewed from the arrow 10 in FIG. 4. As shown in FIG. 10, a concave part 211 is formed on a part of the outside of the outer fixed ring 210. A grease nozzle 406 attached to a tip of the grease line 404 is attached to the concave part 211 of the outer fixed ring 210. As shown in FIG. 10, in the outer fixed ring 210, a through hole 213 is defined extending from the concave part 211 of the outer fixed ring 210 to the inside of the outer fixed ring 210. In addition, as shown in FIG. 10, a groove 209 is defined on an outer surface of the planetary member 208 facing an inner surface of the outer fixed ring 210. The groove 209 is provided over the entire outer surface of the planetary member 208. In addition, the groove 209 of the planetary member 208 is provided in a position that matches the through hole 213 of the outer fixed ring 210. Hence, the grease is supplied from the grease nozzle 406 through the through hole 213 of the outer fixed ring 210 to the groove 209 of the planetary member 208. By rotating and moving the planetary member 208 on the inner surface of the outer fixed ring 210 while the grease is supplied to the groove 209, the grease is supplied to the entire inner surface of the outer fixed ring 210 and the entire outer surface of the planetary member 208. The supply time of the grease is, for example, 10 to 15 seconds.

Figure 11:
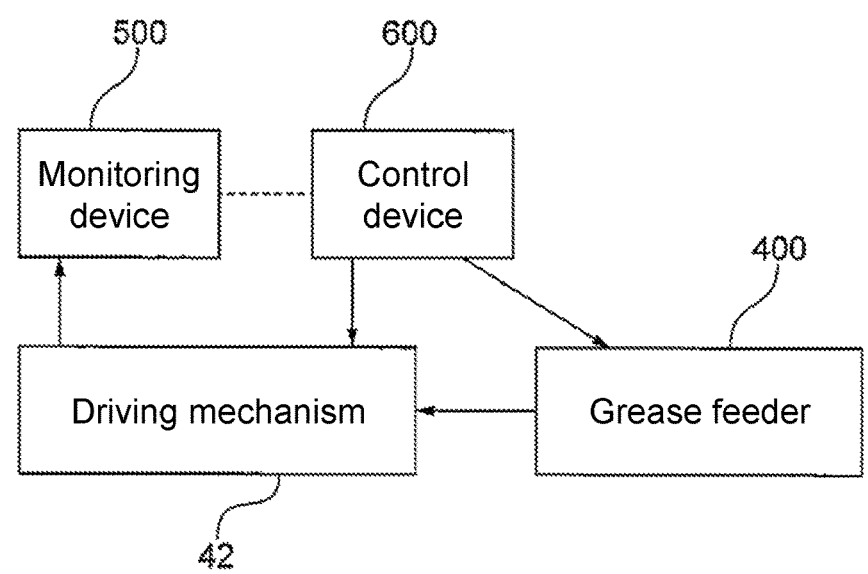
FIG. 11 is a block diagram schematically illustrating a monitoring and control system of a plating device according to one embodiment.

In one embodiment, the plating device includes a monitoring device for monitoring the operation of the driving mechanism and a control device for controlling the operation of the driving mechanism. FIG. 11 is a block diagram schematically illustrating a monitoring and control system of a plating device according to one embodiment. The monitoring and control system of the plating device shown in FIG. 11 includes a monitoring device 500 and a control device 600. The monitoring device 500 is configured to monitor the operation of the driving mechanism 42. The control device 600 is configured to control the operation of the driving mechanism 42. The monitoring device 500 and the control device 600 can be composed of a general computer or a special-purpose computer. The monitoring device 500 and the control device 600 may be composed of the same hardware or different hardware.

In one embodiment, the control device 600 is configured to give operating commands to various actuators of the driving mechanism 42 to operate the driving mechanism 42 under predetermined conditions. In one embodiment, the monitoring device 500 is configured to monitor operating time of the driving mechanism 42, operating distance of the reciprocating motion of the paddle 32, vibration state of the driving mechanism 42, load factor of the motor 44, and so on. The monitoring device 500 is electrically or electronically connected to the driving mechanism 42 and configured to acquire these information. In one embodiment, the monitoring device 500 may be configured to acquire these information from the driving mechanism 42 via a network such as the Internet or the like.

The monitoring device 500 may be configured to monitor not only an operation state of the driving mechanism 42 but also operation states of other driving mechanisms of the plating device. In addition, the control device 600 may be configured to control not only the operation of the driving mechanism 42 but also operation of other driving mechanisms of the plating device.

In one embodiment, the control device 600 may be configured to control the automatic grease feeder 400 according to a predetermined condition to automatically supply grease to the driving mechanism 42. For example, when the predetermined condition is detected in the monitoring device 500, an operating command can be sent from the control device 600 to the automatic grease feeder 400. For example, the control device 600 may be configured to send an operating command to the automatic grease feeder 400 according to at least one of (1) operating time or traveling distance of the driving mechanism 42, (2) magnitude of vibration of the paddle 32, and (3) load factor of the motor 44.

According to the above-described automatic grease feeder, the grease can be supplied without stopping the operation of the driving mechanism 42. Hence, maintenance time of the plating device can be reduced. In addition, since the operation state of the driving mechanism 42 is monitored in advance and the grease can be automatically supplied at a necessary timing, the driving mechanism 42 can always be operated in an appropriate state without applying an excessive load to the driving mechanism 42, and as a result, the life of the driving mechanism 42 can be prolonged.

Although the embodiments of the disclosure have been described above based on several examples, the above embodiments of the disclosure are intended to facilitate understanding of the disclosure instead of limiting the disclosure. The disclosure may, as a matter of course, be modified and improved without departing from the spirit thereof, and the disclosure includes equivalents thereof. In addition, the components described in the claims and the specification can be arbitrarily combined or omitted within a range in which the above-described problems are at least partially solved, or within a range in which at least some of the effects are achieved.

At least the following technical ideas are understood from the above-described embodiments.

[Aspect 1] According to aspect 1, a wet substrate processing device is provided, having: a treatment tank for holding a treatment solution; a stirring paddle disposed inside the treatment tank; and a driving mechanism for driving the stirring paddle, wherein the driving mechanism has: a rotary motor; a central rotating member connected to the rotary motor; an outer fixed ring spaced from the central rotating member and surrounding an outside of the central rotating member; a planetary member connected to the central rotating member so as to rotate inside the outer fixed ring; and a driving shaft connected to the planetary member and the stirring paddle and extending in a radial direction of the outer fixed ring, wherein the driving shaft is configured to reciprocate in a longitudinal direction by rotation of the rotary motor.

[Aspect 2] According to aspect 2, in the wet substrate processing device according to aspect 1, a bearing for guiding the reciprocating motion of the driving shaft is provided.

[Aspect 3] According to aspect 3, in the wet substrate processing device according to aspect 2, the bearing includes a non-contact bearing.

[Aspect 4] According to aspect 4, in the wet substrate processing device according to aspect 3, the bearing includes a fluid bearing.

[Aspect 5] According to aspect 5, in the wet substrate processing device according to aspect 2, the bearing includes a contact bearing.

[Aspect 6] According to aspect 6, in the wet substrate processing device according to aspect 5, the bearing has a rotary roller.

[Aspect 7] According to aspect 7, in the wet substrate processing device according to any one of aspects 1 to 6, a grease feeder for supplying grease between the outer fixed ring and the planetary member is provided.

[Aspect 8] According to aspect 8, in the wet substrate processing device according to aspect 7, the outer fixed ring has a through hole extending in the radial direction, the planetary member has a groove communicable with the through hole of the outer fixed ring, and the through hole of the outer fixed ring is configured to be connectable to a nozzle for supplying the grease.

[Aspect 9] According to aspect 9, in the wet substrate processing device according to aspect 7 or 8, a monitoring device for monitoring a state of the driving mechanism for driving the stirring paddle, and a control device for controlling operation of the grease feeder are provided, wherein the control device is configured to drive the grease feeder according to a driving state of the stirring paddle.

[Aspect 10] According to aspect 10, in the wet substrate processing device according to aspect 9, the monitoring device is configured to monitor at least one of (1) an operating time or a traveling distance of the driving mechanism for driving the stirring paddle, (2) a magnitude of vibration of the stirring paddle, and (3) a load factor of the rotary motor, and the control device is configured to drive the grease feeder according to at least one of (1) the operating time or the traveling distance of the driving mechanism for driving the stirring paddle, (2) the magnitude of vibration of the stirring paddle, and (3) the load factor of the rotary motor.

[Aspect 11] According to aspect 11, an automatic grease supply system for use in a wet substrate processing device having a driving mechanism is provided, the automatic grease supply system having: a monitoring device for monitoring a state of the driving mechanism; a control device for controlling operation of the driving mechanism; and a grease feeder for supplying grease to the driving mechanism, wherein the control device is configured to operate the grease feeder according to the state of the driving mechanism.

[Aspect 12] According to aspect 12, in the automatic grease supply system according to aspect 11, the monitoring device is configured to monitor at least one of (1) an operating time or a traveling distance of the driving mechanism, (2) a magnitude of vibration of the driving mechanism, and (3) a load factor of the driving mechanism, and the control device is configured to operate the grease feeder according to at least one of (1) the operating time or the traveling distance of the driving mechanism, (2) the magnitude of vibration of the driving mechanism, and (3) the load factor of the driving mechanism.

What is claimed is:

1. A wet substrate processing device, having:
   a treatment tank for holding a treatment solution;
   a stirring paddle disposed inside the treatment tank; and
   a driving mechanism for driving the stirring paddle, wherein
   the driving mechanism has:
   a rotary motor;
   a central rotating member connected to the rotary motor;
   an outer fixed ring spaced from the central rotating member and surrounding an outside of the central rotating member;
   a planetary member connected to the central rotating member so as to rotate inside the outer fixed ring;
   a driving shaft connected to the planetary member and the stirring paddle and extending in a radial direction of the outer fixed ring; and
   a supporting member connected to the planetary member and the driving shaft, wherein
   the driving shaft is configured to reciprocate in a longitudinal direction via the supporting member by rotation of the rotary motor,
   the outer fixed ring has a through hole extending from an outer surface of the outer fixed ring to an inner surface of the outer fixed ring, and
   the through hole of the outer fixed ring is configured to be connectable to a nozzle.

2. The wet substrate processing device according to claim 1, having:
   a bearing for guiding the reciprocating motion of the driving shaft.

3. The wet substrate processing device according to claim 2, wherein
   the bearing comprises a non-contact bearing.

4. The wet substrate processing device according to claim 3, wherein
   the bearing comprises a fluid bearing.

5. The wet substrate processing device according to claim 2, wherein
the bearing comprises a contact bearing.
6. The wet substrate processing device according to claim 5, wherein
the bearing has a rotary roller.
7. The wet substrate processing device according to claim 1, having:
a grease feeder for supplying grease between the outer fixed ring and the planetary member via the nozzle.
8. The wet substrate processing device according to claim 1, wherein
the through hole extends in the radial direction,
the planetary member has a groove communicable with the through hole of the outer fixed ring.
9. The wet substrate processing device according to claim 7, having:
a monitoring device for monitoring a state of the driving mechanism for driving the stirring paddle; and
a control device for controlling operation of the grease feeder, wherein
the control device is configured to drive the grease feeder according to a driving state of the stirring paddle.
10. The wet substrate processing device according to claim 9, wherein
the monitoring device is configured to monitor at least one of (1) an operating time or a traveling distance of the driving mechanism for driving the stirring paddle, (2) a magnitude of vibration of the stirring paddle, and (3) a load factor of the rotary motor, and
the control device is configured to drive the grease feeder according to at least one of (1) the operating time or the traveling distance of the driving mechanism for driving the stirring paddle, (2) the magnitude of vibration of the stirring paddle, and (3) the load factor of the rotary motor.

* * * * *